May 14, 1963

M. D. SPURGEON 3,089,358

ADJUSTABLE BORING HEAD

Filed Dec. 17, 1959

INVENTOR.
MARION D. SPURGEON
BY Dugger & Johnson

ATTORNEYS

INVENTOR.
MARION D. SPURGEON

May 14, 1963 M. D. SPURGEON 3,089,358
ADJUSTABLE BORING HEAD
Filed Dec. 17, 1959 5 Sheets-Sheet 5

INVENTOR.
MARION D. SPURGEON
BY Dugger & Johnson
ATTORNEYS

United States Patent Office 3,089,358
Patented May 14, 1963

3,089,358
ADJUSTABLE BORING HEAD
Marion D. Spurgeon, Rte. 3, Box 706, Excelsior, Minn.
Filed Dec. 17, 1959, Ser. No. 860,184
5 Claims. (Cl. 77—58)

This invention relates to a new and novel boring machine and boring tool attachments for said machine. More particularly this invention relates to a boring machine having a multiple spindle drive for simultaneously driving a plurality of boring tools and to new and novel improvements in tools to be used therewith.

It is an object of this invention to provide new and novel improvements in a boring machine useable for boring, drilling, tapping, reaming, countersinking, and etc. wherein very close tolerances are desired. It is a further object of this invention to provide a boring machine having a multiple spindle drive for simultaneously operating a plurality of tools of the same nature to do any one of a variety of work operations on a work piece. It is still a further object of this invention to provide a new and improved boring machine useable for simultaneously operating a number of tools to perform an operation on an uneven work surface portion of a work piece.

It is another object of my invention to provide a new and improved boring machine having means for cooling and lubricating various tool drive members. A further object of my invention is to provide a high precision boring machine that is relatively compact and capable of boring within closer tolerances than machines of the prior art. An additional object of my invention is to provide new and improved multiple spindle drive means for driving a plurality of boring and like tools having an offset crank. Still an additional object of my invention is to provide new and improved multiple spindle drive means for simultaneously driving a plurality of boring and like tools wherein the driving connection includes gear drive connection.

Still a further object of my invention is to provide a new and improved boring machine that is capable of simultaneously boring a number of holes of varying dimensions. Still an additional object of my invention is to provide new and improved boring tools which are capable of extremely close adjustment. Still a further object of my invention is to provide a new and improved boring head that uses a differential screw for adjustably setting the sizes of the bore made by said tool.

Other and further objects are those inherent in the invention herein illustrated, described, and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however of but a few of the various ways in which the principles of the invention may be employed.

The invention is illustrated with reference to the drawings wherein.

Figures 1, 4, 5:
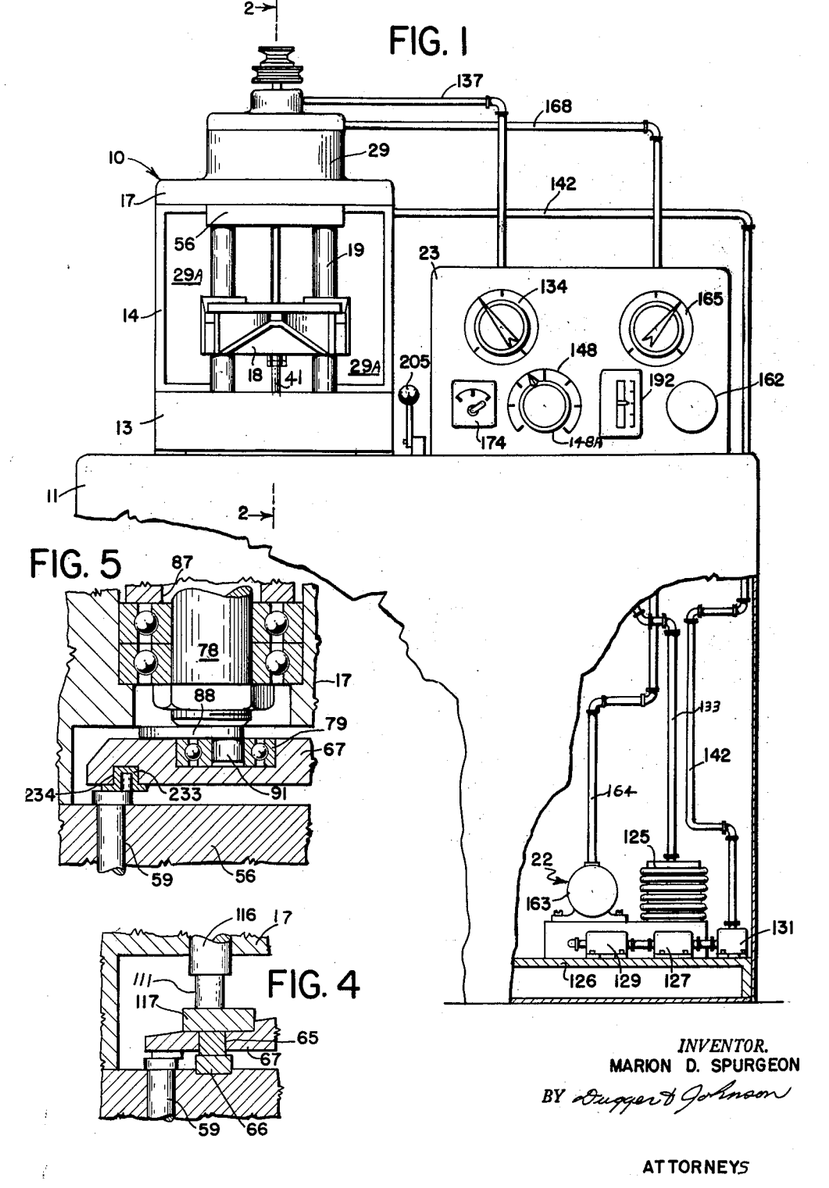
FIGURE 1 is a front elevational view of the boring machine of this invention, a portion of the stand being broken away to illustrate the means for cooling certain operating parts of the machine.
FIGURE 4 is a fragmentary enlarged vertical sectional view of a portion of FIGURE 2 that more clearly illustrates structure for minimizing binding in the drive connections to the drive plate.
FIGURE 5 is a fragmentary enlarged vertical sectional view of a portion of FIGURE 3 that more clearly illustrates structure for minimizing binding in the drive connections to the drive plate.
Figure 2:
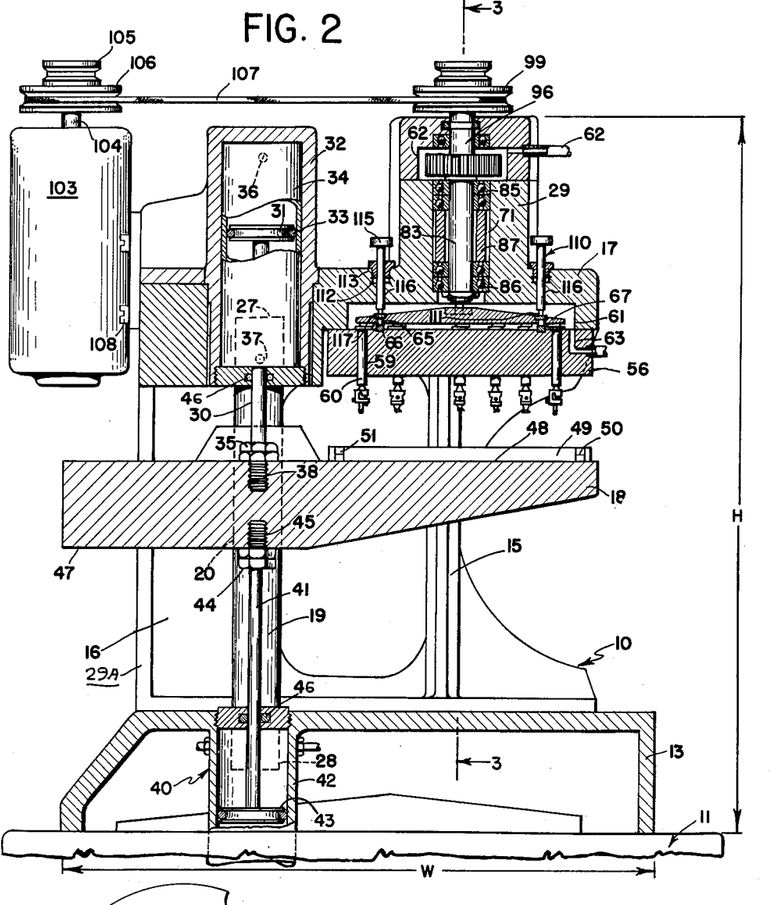
FIGURE 2 is a side vertical sectional view of the boring machine of this invention, said view being taken along the line and looking in the direction of the arrows 2—2 of FIGURE 1 to illustrate the various operating mechanism of the invention.

Referring in particular to FIGURES 1 and 2 there is illustrated a front and a side sectional view of the preferred embodiment of the multiple spindle boring machine, generally designated 10. The boring machine is mounted on a stand 11 which also mounts the control panel 23 and cooling unit 22, said control panel and cooling unit forming a portion of the machine of this invention. The boring machine includes a generally rectangular base 13 which rests on the aforementioned stand, a pair of spaced side members 14 each of which includes a reinforced front portion 15 and a reinforced back portion 16, two back plates 29 and a heavy top cast member 17 which includes a housing portion 29.

A pair of spaced parallel rods 19 having their lower ends mounted in the rod aperture 28 formed in the base and their upper ends mounted in rod apertures 27 formed in the top cast member are provided for guiding work table 18 as said table is moved between an elevated work position and a lower position wherein a work piece such as designated by 75 is positioned on the table. The aforementioned guide rods are located intermediate the sides 14 and adjacent the back plates 29.

The structure for elevating and lowering the table 18 includes an upwardly extending piston rod 30 which has its lower end threaded into aperture 38 formed in the top of the table intermediate the guide rod apertures and its upper end connected to the piston 31 which is mounted for movement in the two-way acting cylinder 32. A piston ring 33 is mounted on the piston to bear against the cylinder liner 34 which is located in the aforementioned cylinder 32. The cylinder 32 is mounted in an appropriate aperture formed in the top casting member and has a top port 36 and a bottom port 37. There are pairs of lock nuts 35 threaded on the lower end of the piston rod for retaining said rod in position.

The mechanism 40 for controlling the rate of movement of the table between an elevated and a lower position includes the piston rod 41 threaded into table aperture 45 that is located directly beneath the table aperture 38, said pison rod being connected at its lower end to the piston 43 which is mounted in the two way acting cylinder 42. The cylinder 42, which is of approximately the same axial length as cylinder 32 is mounted in an aperture formed in the base 13 to depend from said base. A pair of lock nuts 44 are provided for retaining the piston rod in the table aperture. The control circuitry of the mechanism 40 and the function thereof will be set forth hereinafter.

Figure 10:
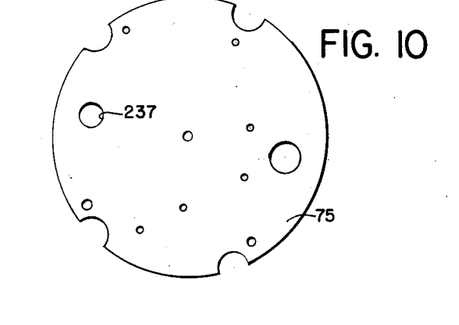
FIGURE 10 illustrates a work piece wherein the various holes shown therein are simultaneously bored in one operation with the boring machine of my invention.

It is to be noted that the table 18 includes an overhanging portion 47 that extends rearwardly of the guide rods and a work mounting portion 48 which extends forwardly of the said guide rods. The overhanging portion forms a counterweight to prevent said table from binding on the guide rods as the table is moved between an elevated and a lowered position. The work mounting portion has appropriate apertures provided therein in which bolts 50 are threaded for retaining the face plate 49 thereon, said bolts being threaded into apertures 51 formed in said face plate. A work piece 75, which in horizontal section may be of a shape as illustrated in FIGURE 10 is releasably retained on the face plate by the holding members 76, said holding members being secured to the face plate.

Secured in depending relation to the under surface of the top casting to be directly above the face plate is a spindle mounting block 56. The mounting block is preferably made of material sold under the trademark Meehanite or other similar type material which has a low coefficient of expansion of the same general magnitude. The block 56 is secured to said casting by appropriate cap screws 57 to close the lower open end of the drive plate chamber 61 which is formed in said casting. An appropriate gasket (not shown) may be provided to form a seal between the block and the casting.

Drilled in the block to extend therethrough are a plurality of vertical spindle apertures 59, the number, the size, and the location of the apertures depending upon the work to be performed and the tools to be used for performing said work on the work piece. A plurality of spacers 66 are mounted in the block to extend upwardly therethrough into the drive plate chamber. The heights of the spacers and the purpose for providing the aforementioned said spacers will become apparent hereinafter.

Formed in the upwardly extending portion of the top casting that forms the housing 29 are three spaced cylindrical apertures 69, 70, and 71, said apertures extending from the top of the casting housing downwardly to open into the drive plate chamber. The cover member 72 is removably secured to the top of the casting by conventional means (not shown), said cover member having a downwardly facing gear chamber 62 formed therein into which each of the aforementioned cylindrical apertures open. A well 73 having a large diametric portion 74 is provided in the cover member to extend therethrough, said well having an axis that coincides with the axis of the cylindrical aperture 71.

Rotatably mounted in the cylindrical apertures 69, 70, and 71 respectively are spindles 80, 78, and drive shaft 83. Each of the spindles and the drive shaft are mounted for rotation and held in spaced relation with respect to the adjacent aperture walls by the top precision preloaded bearings 85, bottom precision preloaded bearings 86, and a spacer 87 mounted between the top and bottom bearings, there being bearings 85, 86 and a spacer 87 mounted on each of the spindles and the drive shaft. A nut 90 is threaded on the lower end of each of the spindles and the drive shaft to bear against the respective bottom bearing.

Figure 3:
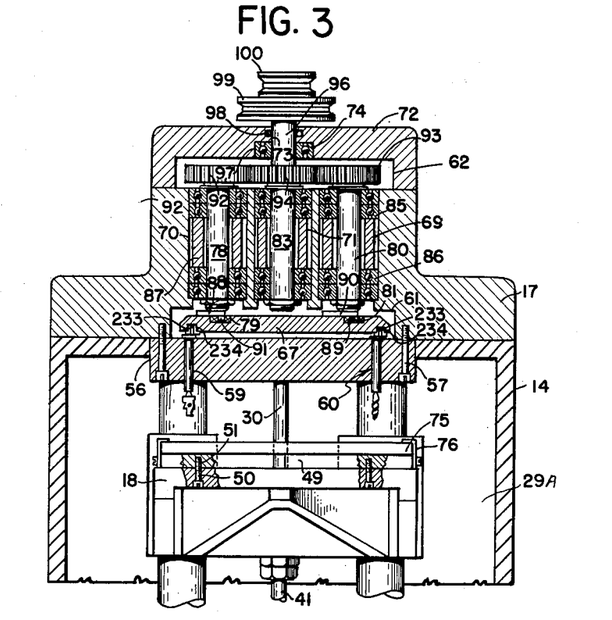
FIGURE 3 is a fragmentary vertical sectional view of the boring machine of this invention, said view being taken along the line and looking in the direction of the arrows 3—3 of FIGURE 2 to illustrate the mechanism for driving the boring tools of this invention and the work table.

The lower end of the drive shaft is spaced above the rectangular shaped drive plate 67 while each of the spindles 78, 80 has a crank 91, 89 respectively depending therefrom to extend into the respective drive plate apertures 81 formed in the top portion of the drive plate. A bearing 79 is mounted on each of the aforementioned cranks to space the crank from the adjacent portions of the drive plate forming the aperture walls and rotatably mount a crank within a drive plate aperture. The drive plate apertures are located such that a vertical plane passed through the longitudinal axis of the drive plate will pass within close proximity of the vertical axis of each of the drive plate apertures.

Formed on each spindle diametrically across from the respective crank to extend radially outward from the spindle is an offset 70. The offset forms a counter balance to offset the unbalancing effect of a crank formed on the spindle. In place of the offset 88, a counterweight may be constructed to be concentric with the axis of rotation of the spindle but properly weighted (by lead or etc.) to give proper balance and still not cause turbulence in the surrounding oil. The drive plate is preferably made of relatively light material such as magnesium for balance purposes.

Mounted on the upper ends of each of the spindles 78, 80 and the drive shaft 83 respectively to be located within the gear chamber are precision gears 92, 93, and 94. The gear 94 is a drive gear for driving gears 92 and 93 in opposite directions from the directions of rotation of said drive gear, gears 92 and 93 being located diametrically across gear 94 from one another.

A shaft extension 96 is formed integral with the top of the drive shaft 83 to extend above gear 94 upwardly through the well 73. A bearing 97 is mounted on the shaft extension to be located in the enlarged diametric portion 74. An O-ring 98 is mounted on the shaft above the aforementioned bearing to form a fluid seal in the upper portion of the well 73. On the upper end of the extension which extends above the cover member there is mounted a large sheave 99 and a small sheave 100.

A variable speed motor 103 is secured to the back portion of the top casting by a plurality of bolts 108, said motor being mounted to have its shaft 104 extend in a vertical direction. A large sheave 106 and a small sheave 105 are keyed on the motor shaft to be driven thereby. A belt 107 is provided for drivingly connecting a sheave mounted on the motor shaft to a sheave mounted on the drive shaft 94.

Four spaced micrometer adjustment mechanisms 110 are mounted on the top casting adjacent the housing 29 to adjust endplay of the spindles, each of said mechanisms being mounted in an aperture 116 to have an adjustment pin 111 extending downwardly into the drive plate chamber to slidably bear against the top surface of a hardened insert 117 mounted in an aperture formed in each corner portion of the drive plate. A shoulder formed in each of the insert apertures seats the inserts therein so that the downward adjustment of the adjusting pin will force the adjacent portion of the drive plate in a downward direction.

The micrometer adjustment mechanism also includes a retainer ring 113 for holding said mechanism in the aperture 116. An O-ring 112 is located in the aperture 116 immediately below the retainer ring to form a seal to prevent oil from leaking from the drive plate chamber through said aperture.

Figures 6, 6A, 6B:
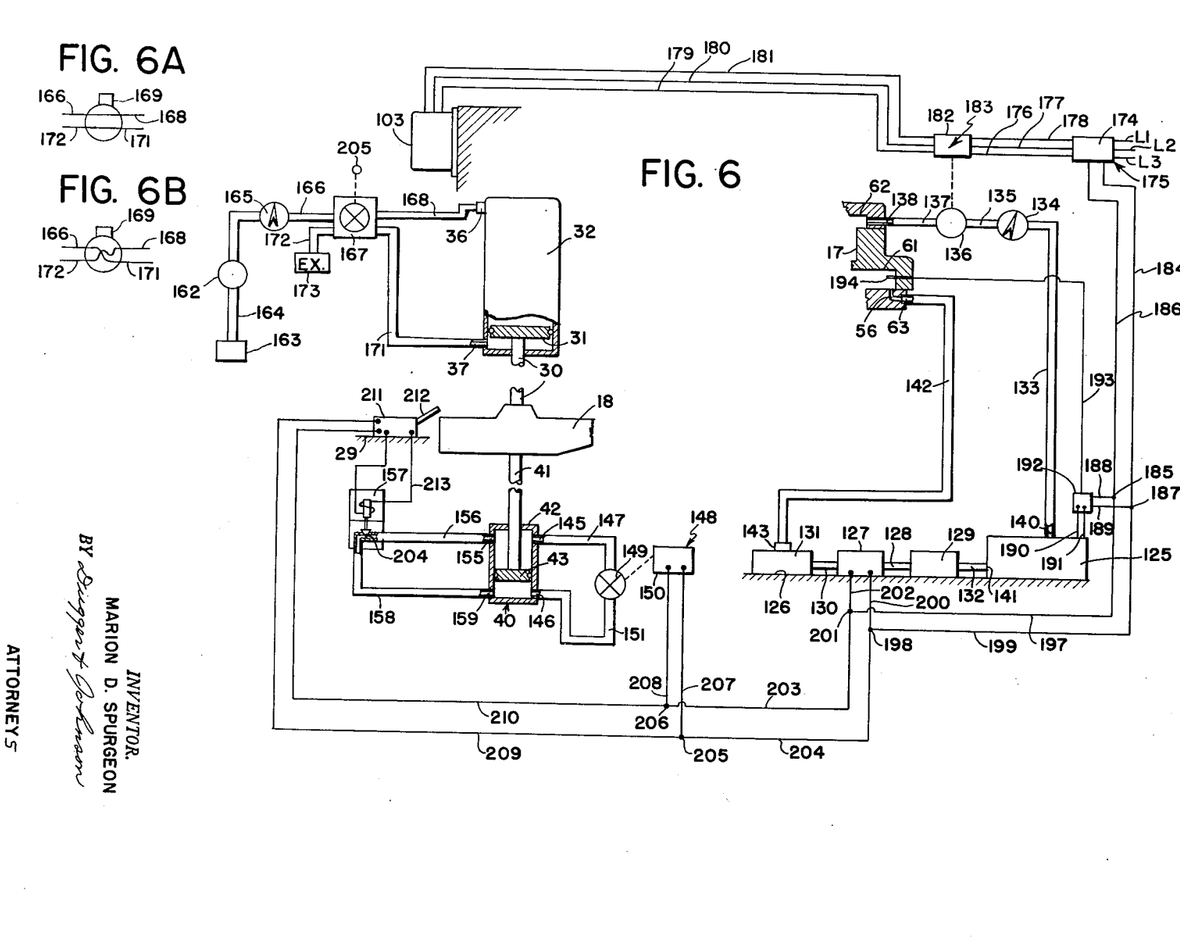
FIGURE 6 is a schematic diagram of the control circuits of the machine of this invention and the machine components to which various control members are connected.
FIGURE 6A is a schematic illustration of fluid connections through the four way air valve when the elevating lever is in a table elevate position.
FIGURE 6B is a schematic illustration of the fluid connections through the four way valve when the elevating lever is in a table lower position.

In order to maintain a nearly constant machine temperature so that extremely close tolerances may be obtained, the afore-mentioned cooling system 22 is provided. The cooling system includes a sump 131, a line 130 connecting the sump to the inlet of the pump 127 and a line 128 connecting the outlet of the pump to the filter 129. The line 132 connects the outlet of the filter to the inlet 141 of the refrigeration unit 125.

The cooling medium in passing through the refrigerating unit passes through appropriate cooling coils (not shown) to outlet port 140 and thence via line 133 to the pressure gauge 134 mounted on the control panel 23. From the pressure gauge the cooling medium passes via line 135 to the valve portion 136 of the pressure actuator switch 183 and thence via line 137 to the drive chamber inlet port 138. The inlet port extends downwardly through the top of the closure member to open into the gear chamber 62.

The cooling medium upon entering the gear chamber lubricates and cools the precision gears mounted therein and then passes downwardly through cylinder apertures 69, 70, 71 to cool and lubricate the members located in the said apertures. From the cylindrical aperture the cooling medium passes through the drive plate chamber to lubricate and cool the members located therein and thence outwardly through the port 63 which is drilled in the block 56. A return line 142 connects the port 63 to the inlet port 143 of the sump. The aforementioned sump, pump, filter, and refrigeration unit may be located on the bottom wall 126 of the stand 11.

In using the machine of my invention it is desirable to move the table at a relatively high rate of speed between the lowered position in which the work piece is secured to the table and the "work position" and then to move said table at a relatively low, constant rate of speed. The mechanism 40 for controlling the rate of movement of the table 18 includes the previously described piston cylinder combination 42, 43. The mechanism providing the fine control of the "low" rate of movement of the table includes a line 147 connected at one end to the top port 145 of the cylinder 42 and at the other end to one port of the valve member 149 of the meter valve, 148. A line 151 connects the opposite port of the valve member to the bottom port 146 of the cylinder 42. An electrically controlled valve actuator 150 operates the valve member 149 said valve actuator including adjustment means 148A for adjustably varying the degree of "opening" of said valve member.

The structure used to control the rapid rate of movement of the table includes a line 156 connected at one end to the top port 155 of the cylinder 42 and the opposite end to one port of the solenoid valve 157. A line 158 extends from an opposite port of the solenoid valve to the bottom port 159 of the aforementioned cylinder.

The mechanism for raising and lowering the table includes the previously described piston cylinder combination 30, 32. A source 163 of pressurized air is provided for operating the aforementioned piston cylinder 31, 32, said cylinder being connected by line 164 to air pressure gauge 165 which in turn is connected via line 166 to one port of the four way valve 167. A line 168 extends from a second port of the four way valve to the top port 36 of the cylinder 32. A third port of the four way valve is connected via line 171 to the bottom port 37 of the aforementioned cylinder while the fourth port is connected via line 172 to the exhaust 173.

There is provided a three position manually operated control lever 205 for controlling the operation of the valve 167. When the control lever is in an "table lower" position (see FIGURE 6B) the valve makes a fluid connection between lines 166 and 168 so that the air source is fluidly connected to the top of the cylinder 32 and a fluid connecion between lines 172 and 171 so that the bottom of the same cylinder is connected to the exhaust 173. When it is desired to raise the table, the control lever is moved to a "table elevate" position (see FIGURE 6A) to operate the valve for making a fluid connection from the line 166 to line 171 thence to the bottom of the cylinder and at the same time to make a second fluid connection from the top of the cylinder through line 168 to said valve and thence line 172 to the exhaust 173.

The electrical control circuitry for the boring machine, generally designated 175, includes main lines L-1, L-2, and L-3 which are connected to a suitable power source. The aforementioned main lines are connected to the On-Off two speed motor control switch 174 which in turn is connected via lines 176, 177 and 178 to the electrical control portion 182 of the pressure switch 183 and thence through lines 179, 180, and 181 to the motor 103. The switch 183 is of the type that remains in an "off" position until a predetermined pressure has built up in the valve portion 136 of the pressure switch. Thus even though the master On-Off switch 174 is turned "on," the motor 103 will not be energized until sufficient oil pressure has built up in gear chamber 62. The actuator portion has adjustment means (not shown) so that the pressure required to actuate the control portion 182 may be adjustably varied.

Also extending from the On-Off switch 174 are a pair of lines 186, 184 which pass through junction 185, 187 respectively and thence through lines 188, 189 respectively to the temperature control switch 192. A pair of lines 190, 191 extend from the temperature control switch to the motor portion (not shown) of the refrigeration unit 125. A conduit 193 extends from the temperature control switch to the temperature sensing element 194, said sensing element mounted to extend into the drive gear chamber. The temperature sensing element and temperature control switch are of the nature that a change of temperature of ¾° from a predetermined temperature of the temperature control will electrically connect line 188 to line 190 and line 189 to line 191 to turn on the refrigerator motor. Through the use of the cooling system and the temperature control switch and sensing element, the temperature at the top of the block may be held within a tolerance of a plus or minus one degree Fahrenheit of the predetermined temperature. When the temperature in the drive gear chamber is within the desired range, the sensing element 194 actuates appropriate mechanism (not shown) in the switch 192 to de-energize the refrigeration unit motor (not shown) of the refrigeration unit 125. As a result the cooling medium is pumped by pump 127 through the refrigeration unit without the refrigeration unit acting to cool the cooling medium below temperature necessary to keep the boring tool head at the desired temperature.

The junction 185 is connected via line 197 to a junction 201 which in turn is connected to the pump 127 via line 202. The junction 187 is connected by line 199 to junction 198 which in turn is connected via line 200 to a second terminal of the pump. The junction 198 is also connected via line 204 to junction 205 which in turn is connected to the first terminal of the meter valve 148 by the line 207. The second terminal of the meter valve is connected by line 208 to junction 206 which in turn is connected by line 203 to junction 201.

The previously mentioned junction 205 is also connected by line 210 to the first terminal of the limit switch 211 while the second terminal of the limit switch is connected via line 209 to the junction 205. The solenoid coil 213 of the solenoid valve 157 is connected across the third and fourth terminals of the limit switch.

The limit switch includes an arm 212 which is operated by the table 18 to be moved to a position in which the coil 213 is de-energized and a second position in which the coil 213 is energized, there being appropriate mechanism (not shown) in the switch 211 to make the aforementioned connections. Thus when the table has been elevated so that the work piece mounted thereon is closely adjacent to the work tools the switch arm 212 is moved to a position to energize the solenoid coil which in turn moves the valve members 204 to a position to close the fluid channel between ports 155 and 159 of the cylinder 42. When the table is again moved in a downward direction, the switch arm is moved to de-energize the solenoid coil and thereby move the member 204 to open the fluid channel between ports 155 and 159.

The limit switch is mounted on the plate 29. It is desirable that provision be made for securing the limit switch in an adjustable vertical position on the back plate 29 so that the speed of elevation of the table may be changed at varying elevations of the table and thereby compensate for work pieces of different heights.

A boring tool 60 (see FIGURE 11) is rotatably mounted in the spindle aperture 59 of the block. The boring tool includes an elongated cylindrical spindle 220 of a diameter to form a close fit with the walls of the spindle aperture 59, an enlarged cylindrical spindle head 221 formed integral with the upper end of the spindle to abut against the bearing surface 233, and a crank 222 formed integral with the spindle head. The vertical axis of the crank is offset from the vertical axis of the spindle. Each crank is mounted in a bearing 233 which is mounted in appropriate recess 234 formed in the spindle block. The spindle is of an axial length to extend through the block and has an axially extending threaded aperture 224 for threading the boring head shank 226 of the boring head 225 therein. Preferably the tool spindles have a hardened chrome surface.

Figures 8, 9, 11, 12:
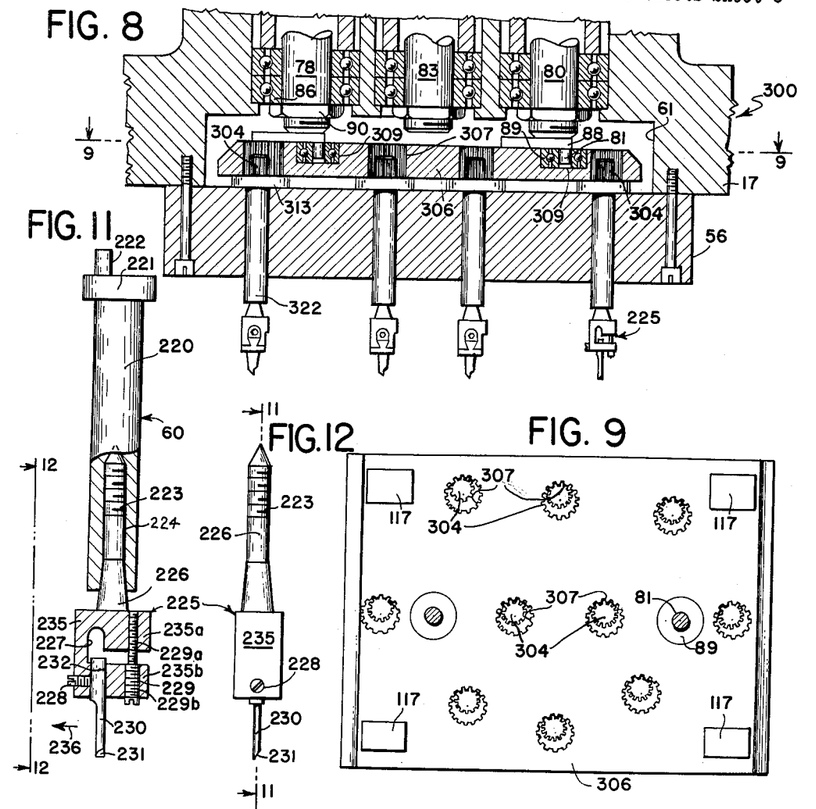
FIGURE 8 is an enlarged fragmentary view of a boring machine of this invention, said view corresponding in part to FIGURE 3 and illustrating the second embodiment of the multiple spindle drive mechanism for driving a plurality of tools and the tool spindles used therewith.
FIGURE 9 is an enlarged top sectional view taken along the line and looking in the direction of arrows 9—9 of FIGURE 8 to illustrate the drive plate and the drive connections to the tools of the second embodiment of my invention.
FIGURE 11 is a vertical side view, part in section of a first embodiment of boring tool spindle and boring head of my invention, said view in part being taken along the line and looking in the direction of arrows 11—11 of FIGURE 12.
FIGURE 12 is a front view of a boring head illustrated in FIGURE 11, said view (in part) being taken along the line and looking in the direction of the arrows 12—12 of FIGURE 11.

The boring head includes a generally rectangular body portion 235 formed integral with the shank to depend therefrom. An L-shaped notch as shown in FIGURE 11 is formed in the aforementioned body portion to have a vertically extending leg located offset from a line passed through the shank axis and a horizontally extending leg that crosses the spindle axis to separate the major portion of the body portion into two sections 235a, 235b. A vertical aperture is formed in the outer edges of each of the aforementioned body sections to be located on the opposite side of the spindle axis from the vertical leg of the L-notch. A differential screw 229 having a portion 229a formed with threads of a first pitch is threaded into the aperture formed in section 235a and a portion 229b having threads of a second pitch is threaded into the second section 235b.

A vertical aperture 232 is drilled in the boring head section 235b to extend directly below the vertical L-leg for mounting a bore bar 230 therein, said bar having a cutting edge 231. A set screw 228 is provided to bear against the upper end of the bore bar to secure said bar in the boring head.

As may be noted, the vertical axis of the bore bar is offset from the rotational axis of the spindle, thus as the spindle is rotated the bore bar bores a hole 237 in a work piece 75. By turning the differential screw in the appropriate direction, the two sections 235a, 235b will be "spread" relative to one another so that the bore bar is moved in the direction of the arrow 236 to provide an adjustment for boring a hole of a larger diameter.

If it is desired to drill holes of a diameter other than those possible with the bore head 235, a second bore head of a different dimension may be threadedly mounted in the spindle 220. Also it is within the purview of this invention to provide spindles of different sizes to which the bore head 225 may be threadedly connected. By interchanging a plurality of the bore heads of different sizes with a plurality of spindles, it is possible to bore an infinite number of different size bore holes.

Figure 13:
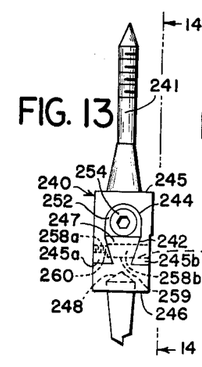
FIGURE 13 is a vertical front view of a second embodiment of a boring head of my invention; said view being taken along the line and looking in the direction of the arrows 13—13 of FIGURE 14.
Figure 14:
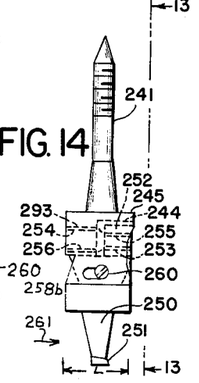
FIGURE 14 is a side view of the boring head of FIGURE 13, said view being taken along the line and looking in the direction of the arrows 14—14 of FIGURE 13.
Figure 15:
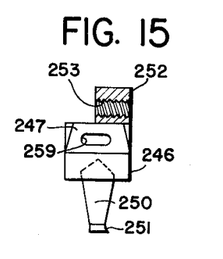
FIGURE 15 is a side view of the slider portion of the boring head illustrated in FIGURES 13 and 14.

A modified embodiment of the bore head, generally designated 240, having a shank 241 may be threaded into the spindle 220 in place of the bore head 225. The boring head 240 includes a body portion 245 and a slider portion 246 which is removably attached to said body portion. An inverted trapezoidal shaped notch 242 is formed in the lower end of the body portion to extend the length L of said body portion for mounting a correspondingly shaped protuberance 247 of the slider therein, said protuberance being located on the opposite side of the slider from the bore bar aperture 248 in which the bore bar 250 that has a cutting edge 251 is mounted. The body portion has legs 245a and 245b formed to have surfaces to abut against corresponding surfaces of the slider on either side of the aforementioned protuberance. A rounded recess 244 is formed to join with the upper end of the trapezoidal shaped notch to extend half-way across the longitudinal length of the body portion. A longitudinally extending aperture 293 is drilled in the body portion to open into the rounded recess, said aperture being spaced above the adjacent portion of the notch 242.

The slider has a rounded offset 252 of a size and shape to fit within the rounded recess, said offset being formed integral with the protuberance 247 to extend thereabove. An aperture 253 is formed in the rounded offset to have an axis that coincides with the axis of the aperture 293. The aperture 253 is threaded for mounting the end 255 of the differential screw 254 which has threads of one pitch while the aperture 259 is threaded for mounting the opposite end 256 of the differential screw which has threads of a second pitch.

A threaded transverse aperture 258a is formed in leg 245a and a non-threaded transverse aperture 258b is formed in leg 245b to have an axis that coincides with the axis of aperture 258a. The apertures 258a, 260 open into the trapezoidal notch. An elongated transverse opening 259 having a height slightly greater than the diameter of the leg aperture 260 and a longitudinal length substantially greater than the diameter of the leg apertures 258a, 260 is formed in the protuberance portion of the slider so that the locating screw 258b which when its threaded end is threaded into aperture 258a will extend through said elongated opening into aperture 260. The locating screw 258b serves to limit the slidable movement of the slider portion in the body portion and at the same time prevent any substantial "pivotal movement" of the slider portion relative to said body portion which might otherwise occur as the tool is being used.

As may be noted in FIGURES 13 and 14, the vertical axis of the boring bar coincides with the vertical axis of the shank; however, by turning the differential screw 254 in an appropriate direction, the slider will be moved in the notch 242 in the direction of the arrow 261 away from the axis of rotation of the shank and thus provide an adjustment for boring holes of a larger diameter. The shank 241 may be of the same size as shank 223 so that the boring head 240 may be interchanged with the boring head 225. Similarly the boring head 240 may be made of varying dimensions similarly as set forth in the description of the boring head 225.

Figure 16:
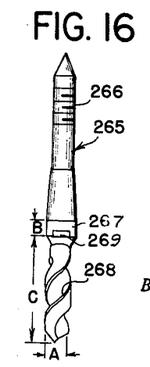
FIGURE 16 illustrates a new and improved drilling tool that is mountable in either the spindle illustrated in FIGURE 8 or in FIGURE 11.

To use the boring machine of my invention for a drilling operation wherein it is desired that the diameter of the hole drilled be held within close tolerance I have provided a new and novel drill generally designated 265. The drill has a threaded shank 266 which is shaped and of a size to threaded into the threaded aperture 224 of the spindle 220.

Formed integral with the shank is a body portion 267 having flattened lands 269 thereon to facilitate holding the drill with a wrench, and a fluted portion 268 which is formed integral with the body portion. A plurality of drills of various sizes may be provided wherein, for example, one drill has a diameter A of .040 inch, a body height B of .50 inch, and a fluted section C of .50 inch while a drill of the other size may have a diameter A of .188 inch, a body height of .20 inch, and a fluted section C of .80 inch. By providing the series of drills 265 of my invention it is not necessary to use bushings or guides to drill holes wherein the tolerances are to be held very close and at the same time the drills may be interchanged with a boring head. Advantageous results are obtained when using a drill of my invention since the dimension B is very short as compared to drills of the prior art.

One embodiment of the boring machine of my invention having been described, I will now describe a second embodiment of my invention, generally designated 300. The second embodiment of the boring machine may be of the same general construction as the first embodiment with the exception of the lower end of each of the drive spindles, drive plate, and the upper end boring tool spindle. Therefore for the most part I will only describe the members of a different structure than those described for the first embodiment.

Referring in particular to FIGURES 8 and 9 there is illustrated a drive plate 306 mounted in the drive plate chamber 61 similarly as the drive plate of the first embodiment was mounted in said chamber. The structure for driving the drive plate 306 is the same as that for driving drive plate 67, there being spindles 78, 80 each having a crank portion 81 with a bearing 89 mounted therearound. Each bearing 89 is mounted in an appropriate aperture 309 formed in the top portion of the drive plate.

In the drive plate 306, there are provided a plurality of tooth apertures 307 that extend vertically through the drive plate, said apertures being of sufficient diameter to drivingly rotate the concentric toothed projection 304 formed integral with the enlarged cylindrical portion 313. The cylindrical portion is formed integral with upper end of the cylindrical spindle 322. The aforementioned drive plate 306 may be used for driving spindles 322 that have secured thereto a boring head, a drill, or any other suitable tool for performing the desired operation on the work piece.

Figure 7:
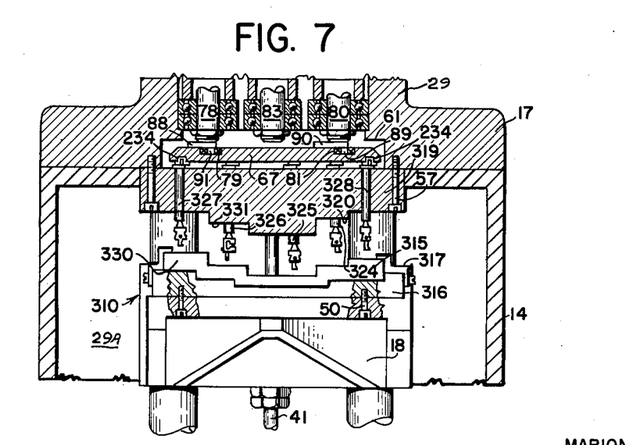
FIGURE 7 is a vertical sectional view of a boring machine of this invention, said view corresponding in part to FIGURE 3 except that an irregular shaped work piece is mounted on the work table.

If it is desired to perform, for example, a boring operation on an irregular shaped work piece, such as work piece 315, which has a plurality of stepped portions 330, a third modified embodiment of the boring machine of my invention such as illustrated in FIGURE 7 may be used. The structure of the third modified embodiment of my invention, generally designated 310 and illustrated in FIGURE 7 is generally the same as that of the embodiment illustrated in FIGURES 1–6 inclusive with the exceptions that will be set forth hereinafter. The embodiment 310 includes a face plate 316 having an upper surface shaped to correspond to the bottom surface of the work piece which is removably attached to the table 18 by conventional means such as cap screws 50. The work piece 315 is detachably retained on the face plate by a plurality of holding members 317.

In order that the plurality tool spindles 324–328 inclusive used in the boring operation may be adequately supported to maintain the desired tolerances, a block 319 having a plurality of stepped portions 320 shaped to a matching fit with the upper surface of the work piece is secured to the housing 29 by screws 57. Each of the spindles 324–328 inclusive may be of the same construction as the spindle 220 with the exception that the axial length of the different spindles is slightly longer than the vertical height of the step portion 320 of the block in which the spindle is mounted. The mechanism for driving the tool spindles may be the same as that described for driving the drive plate of the first embodiment or may be the same as that described in the description of the second embodiment. Of course, it is to be understood that if the drive of the second embodiment is used and the crank portion of the tool spindles will be corresponding to that of spindles 322.

Having described the structure of various embodiments of my invention I will now set forth the description of the operation of the embodiments of the boring machine of my invention. It will be assumed that a plurality of irregularly spaced holes 237 drilled in a work piece 75 such as illustrated in FIGURE 10 are to be bored in one operation. First an appropriate face plate 49 is secured to the table 18 and then the work piece is secured to the space plate by holding members 76. A plurality of tool spindles are mounted in the block 56 which has the desired number of spindle apertures drilled therein at the appropriate locations.

A boring head is threaded into each of the spindles and the respective differential screws are turned to "adjust" the boring bar for boring a hole of the desired size. The boring head block is secured to the top casting by cap screws 57 after a drive plate has been mounted on the block so that the cranks of each of the tool spindles extends into the appropriate apertures of bearings 233. It is to be noted that the bearings 233 are located in the drive plate so that the vertical axis of each bearing aperture is located on a radial line from the respective spindle axis that extends in the same angular direction as each of the other radial lines that pass through the vertical axes of each of the other spindles. Similarly each of the bearings 79 are located on the drive plate so that the vertical axis of each of the bearings 79 lies on a radial line that extends through the spindle axis of the respective spindles 78, 80 in the same angular direction as the aforementioned lines that are passed through the spindle cranks. As a result when the drive shaft 83 is rotated in a counterclockwise direction each of the spindles 78, 80 is rotated in a clockwise direction. The spindles 78, 80 in rotating move their respective crank portions 79 to translate the drive plate 67 through a path of rotary motion which in turn drives the cranks of the tool spindles mounted in the block 56 to rotate said spindles.

To insure that only torque is transmitted to the tool spindle cranks when the drive crank spindles are rotated, spacers 66 have been provided to hold the drive plate elevated above the enlarged cylindrical head portion of the spindles so that under substantial pressure, the enlarged diametric portions of the tool spindles will not bind on the top of block 56 and at the same time sufficient pressure may be exerted against the top of the tool spindles to maintain said spindles in position. The member 65 is a harder brushing fixedly secured in the block 67 to thrust on spacer 66 to prevent said block binding on the spindle 59. The micrometer adjustments mechanism 110 have been provided to properly "align" the drive plate so it does not bind any of the cranks as it is translated through a rotary path of motion. The aforementioned micrometer adjustments and differential screw adjustments are made for each of the boring heads after the block has been secured to the housing 79.

Prior to turning on the master On-Off switch, the limit switch is secured at the proper elevations for the workpiece mounted in the table. Now the master On-Off switch 174 is thrown to an On position which energizes the pump, the meter valve, and applies power to the terminals of the limit switch, temperature control switch 192 and switch 183. The pump is thus actuated to force oil upwardly into the gear chamber and if the cooling medium is not of the predetermined temperature as sensed by element 194, switch 192 is actuated to energize the refrigeration unit motor. When the cooling medium pressure has built up to the predetermined value, the valve portion 136 will operate the switch 183 to energize the motor 103. Now the three position reversing switch 205 may be moved to a position for applying air to the bottom of the cylinder 32 to elevate the table. As the table is elevated, the piston 43 is moved in an upward direction in the cylinder 42 to force the fluid in said cylinder outwardly through each of the ports 145, 155 and thence through connecting lines to the bottom port 146, 159 respectively. As soon as the table has elevated the work piece to a position within close proximity of the bottom of the boring bars, the table moves switch arm 212 to energize the solenoid coil 213 which in turn moves the valve member 204 to a closed position. When the valve 204 is moved to a closed position the fluid in the cylinder 42 can only flow out of said cylinder by the way of the metering valve 148 and as a result the rate of elevation of the table is depended upon the setting of the metering valve. That is, for example, if the material of the work piece is of the nature that will permit the bore bar to pass readily therethrough, the metering valve may be adjusted to permit fluid to pass rather rapidly through said valve and thus the cable will be elevated at a relatively high rate of speed; however, if the material is relatively hard then the adjustment may be made so that the fluid flows through the meter valve at a relatively low rate and thus the table will be elevated at a relatively slow rate.

After the table has been elevated a sufficient amount so that the boring operation is completed the reversing switch 205 is manually moved to a "table lowering position" or there may be provided limit switches (not shown) and automatic controls which will move the reversing switch to a table lowering position as soon as the boring operation is completed.

Moving switch 205 to a table lower position, the air supply is connected to the top of cylinder 32 to force the piston in the downward direction; however, the rate of the movement of the table is still controlled by the flow rate of fluid through valve 148. As soon as the table has been lowered a sufficient amount so that the boring bars are located above the work piece, the switch arm 212 will be thrown to a position to de-energize the solenoid coil 213 and thus permit fluid to flow through lines 156, 158 and thereby allow the table to move at a faster rate.

It is to be understood that the aforegoing method of operation will be the same if a drilling operation instead of a boring operation is to be performed. If it is to be a drilling operation then a drilling tool as illustrated in FIGURE 15 is threaded in the tool spindle in place of the boring head. If the work piece is of irregular shape then appropriate structure, for example as illustrated in FIGURE 5, may be used for mounting the work piece and appropriate length spindles are used for driving the boring heads or other tools used for performing the desired operation on the work piece.

It is to be understood that it is within the purview of this invention that appropriate tools selected from a group such as illustrated in FIGURES 12, 14 and 16 may be used with either of the tool spindles such as spindle 220 or spindle 332 depending upon the type of drive plate that is being used.

From the foregoing explanation it is apparent that a number of boring tools may be mounted for rotation in the appropriate spindle block, the spacing of said boring tools being limited by the diameter of a spindle, the transverse cross sectional area of the boring heads and the diameter of the crank head portions of the spindle. By using the proper number of boring tools, said boring tools having the proper size bore heads therein, all of the holes of the work piece may be bored out simultaneously in a simple operation. By using the boring machine and boring tools described hereinafter, a machine may be properly adjusted so that the boring bar will advance .0003 inch for a complete revolution of the boring head and thereby giving much closer control of the boring operation than by use of the machines of prior art. As a result tolerances of .0001 inch are obtained. Further by using the tools and machines of this invention the various parts thereof may be interchanged with parts of other boring machines of this invention and after the previously described adjustments are made, the same tolerances are achieved as using the first machine. Thus the repetition of hole locations in various work pieces can be held substantially as close as the coefficient of expansion of the material that the machine is made of.

As an example of the advantages of using a machine of my invention, but not as a limitation thereof, a boring machine of the preferred embodiment of my invention having a width W of approximately 20 inches, a height H of approximately 19 inches and having a work capacity of a six inch cube may be used for simultaneously boring a plurality of holes in a work piece 75 of a diameter of three inches. The plurality of holes bored may be of dimensions in the range of .046–.500 inch and the hole spacing may be held to a tolerance of ±.0002 inch. That is, the machine of this invention will withhold close tolerances of ±.0001 inch in 6 inches at a given temperature.

As many widely apparently different embodiments of this invention may be made without departing from the spirit and scope thereof, it is to be understood that I do not limit myself to the specific embodiments herein.

What I claim is:

1. For rotatably mounting on a boring machine, a boring tool comprising a spindle having a normal axis of rotation, a bore head, an elongated shank joined at one end to the bore head and at the other end detachably connected to the spindle, a bore bar secured to said bore head offset from said axis of rotation, said bore head having two sections separated by an L-shaped slot having one leg extending in the direction of said axis of rotation and a second leg crossing the axis of rotation and a differential screw threaded into said sections for changing the relative positions of said sections to thereby reposition the bore bar relative to the axis of rotation.

2. For rotatably mounting in a boring machine, a boring tool comprising a spindle having a normal axis of rotation, a bore head having a first section and a second section, a shank joined at one end to the first section and at the other end detachably connected to the spindle, a bore bar attached to said second section, said sections having cooperating means for forming an interlocking sliding fit lateral to said axis of rotation, a differential screw threaded into said cooperating means to adjustably position one of the sections in a lateral direction relative to said axis of rotation, said sections having locating means extending generally transverse to said rotational axis and said lateral direction for preventing any substantial pivotal movement of one section relative to the other.

3. For a boring machine, a boring tool, a bore head having a first section and a second section, a shank having a normal axis of rotation joined at one end to the first section, a bore bar attached to said second section, said sections having cooperating means for forming an interlocking sliding fit to permit the second section sliding laterally relative to said axis of rotation, a differential screw threaded into said cooperating means for adjustably laterally positioning the sections relative to one another, the first section cooperating means having an aperture on either side of the second section cooperating means extending transversely to the direction of sliding movement and the second section cooperating means having an elongated transverse opening of a longitudinal length greater than the diameter of said apertures and a locating screw extending through said opening and apertures and threaded in at least one of said apertures.

4. The structure of claim 3 further characterized in that each section is an integrally formed unit and that the first section cooperating means includes a notched portion and that the second section cooperating means includes a trapezoidal shaped protuberance having surfaces corresponding surfaces of said notched portion.

5. For use on a boring machine, a boring tool comprising a boring head having two sections, a shank secured to one of said sections to extend outwardly therefrom in one direction to have a normal axis of rotation when used on a boring machine, a bore bar attached to the other section to extend in the opposite direction from said shank, said sections being separated by an L-shaped slot that has one leg parallel to the axis of rotation and a second leg that crosses the axis of rotation, and a differential screw, each of said sections having integrally formed means to have the differential screw threaded therein for selectively changing the relative positions of the sections and retaining the sections in an adjusted position to thereby change the position of the bore bar relative to the axis of rotation and hold the bore bar in said adjusted position, said means having the differential screw threaded therein to extend parallel to said axis of rotation.

References Cited in the file of this patent

UNITED STATES PATENTS

| | | |
|---|---|---|
| 1,326,863 | Heinkel | Dec. 30, 1919 |
| 2,305,737 | Richards | Dec. 22, 1942 |
| 2,398,491 | Bell | Apr. 16, 1946 |
| 2,524,043 | Daugherty | Oct. 3, 1950 |
| 2,550,649 | Zagar | Apr. 24, 1951 |
| 2,661,218 | Snow et al. | Dec. 1, 1953 |
| 2,857,491 | Harter | Oct. 21, 1958 |
| 2,946,243 | Gothe | July 26, 1960 |
| 2,972,914 | Lanier | Feb. 28, 1961 |

FOREIGN PATENTS

| | | |
|---|---|---|
| 558,789 | Germany | Sept. 10, 1932 |

OTHER REFERENCES

Fuchs, German application 1,042,344, printed Oct. 30, 1958 (KL 49a 43/01).

The Cleveland Twist Drill Co. Catalog No. 56, copyright 1956, on file in Div. 58, page 14.